US008904754B2

(12) United States Patent
Sasaki

(10) Patent No.: US 8,904,754 B2
(45) Date of Patent: Dec. 9, 2014

(54) CONTROL APPARATUS AND CONTROL METHOD FOR INTERNAL COMBUSTION ENGINE

(71) Applicant: Toshitake Sasaki, Toyota (JP)

(72) Inventor: Toshitake Sasaki, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/937,624

(22) Filed: Jul. 9, 2013

(65) Prior Publication Data
US 2014/0020363 A1 Jan. 23, 2014

(30) Foreign Application Priority Data

Jul. 17, 2012 (JP) ................. 2012-158569

(51) Int. Cl.
| | | |
|---|---|---|
| F01N 3/00 | (2006.01) | |
| F02D 41/22 | (2006.01) | |
| F02D 41/12 | (2006.01) | |
| F02D 41/14 | (2006.01) | |
| F01N 3/10 | (2006.01) | |
| F01N 11/00 | (2006.01) | |
| F02D 29/02 | (2006.01) | |

(52) U.S. Cl.
CPC ............... *F01N 3/10* (2013.01); *F02D 41/222* (2013.01); *F02D 41/123* (2013.01); *Y02T 10/40* (2013.01); *F02D 41/1495* (2013.01); *F02D 2200/0802* (2013.01); *F01N 2900/1602* (2013.01); *F01N 11/002* (2013.01); *F02D 29/02* (2013.01)
USPC .............................................. 60/274; 60/286

(58) Field of Classification Search
CPC ......... F01N 3/10; F01N 11/002; F02D 29/02; F02D 41/123; F02D 41/222; F02D 41/1495
See application file for complete search history.

(56) References Cited

U.S. PATENT DOCUMENTS

| | | | |
|---|---|---|---|
| 2004/0050036 A1* | 3/2004 | Ueda et al. ................ | 60/285 |
| 2009/0043437 A1* | 2/2009 | Shiino ......................... | 701/22 |
| 2009/0150019 A1* | 6/2009 | Sakamoto et al. ......... | 701/29 |
| 2009/0288646 A1* | 11/2009 | Demura et al. ........... | 123/521 |
| 2010/0076635 A1* | 3/2010 | Sugimoto .................. | 701/22 |
| 2010/0256849 A1* | 10/2010 | Akimoto .................... | 701/22 |
| 2011/0192146 A1* | 8/2011 | Sugimoto et al. ......... | 60/276 |
| 2012/0060479 A1* | 3/2012 | Tsukamoto et al. ....... | 60/278 |

FOREIGN PATENT DOCUMENTS

| | | | | | |
|---|---|---|---|---|---|
| JP | 2001152942 | A | * | 6/2001 | ............. F02D 41/22 |
| JP | 2005076468 | A | * | 3/2005 | ............. F02D 41/12 |
| JP | 2008175134 | A | * | 7/2008 | |
| JP | 2009-167937 | A | | 7/2009 | |

* cited by examiner

*Primary Examiner* — Thomas Denion
*Assistant Examiner* — Jason Shanske
(74) *Attorney, Agent, or Firm* — Kenyon & Kenyon LLP

(57) ABSTRACT

An engine ECU diagnoses the presence or absence of abnormality during execution of the fuel cut. The engine ECU is configured to restrict the fuel cut according to the temperature of a catalyst when the temperature is higher than a fuel-cut-restriction temperature of the catalyst. The engine ECU is configured to set the fuel-cut-restriction temperature is lower when the diagnosis has been completed than when the diagnosis has not been completed. Furthermore, the engine ECU continues the fuel cut if the diagnosis is completed during execution of the fuel cut while the temperature of the catalyst is between the fuel-cut-restriction temperature set prior to the completion of the diagnosis and the fuel-cut-restriction temperature set after the completion of the diagnosis.

5 Claims, 9 Drawing Sheets

CONTROL APPARATUS AND CONTROL METHOD FOR INTERNAL COMBUSTION ENGINE

INCORPORATION BY REFERENCE

The disclosure of Japanese Patent Application No. 2012-158569 filed on Jul. 17, 2012 including the specification, drawings and abstract is incorporated herein by reference in its entirety.

BACKGROUND OF THE INVENTION

1. Field of the Invention

The invention relates to a control apparatus and a control method for an internal combustion engine.

2. Description of Related Art

A fuel cut control in which fuel injection and ignition are temporarily stopped at the time of deceleration or the like is known. In some cases, the fuel cut may restrain unnecessary consumption of fuel. During execution of the fuel cut, the air/fuel ratio inevitably becomes lean. This makes it possible to diagnose the presence or absence of abnormality of an air/fuel ratio sensor, or the like, on the basis of whether during execution of the fuel cut, the output of the air/fuel ratio sensor shows that the air/fuel ratio is lean.

If the fuel cut is executed, for example, when a catalyst has high temperature, particles of platinum (Pt) constituting the catalyst may react with oxygen, which is supplied in excess, and may grow into large particles of Pt. This can result in a reduced total surface area of Pt, that is, a reduced contact area of Pt with exhaust gas. Consequently, the emissions purifying performance of the catalyst may decline. As a measure to cope with this phenomenon, it is possible to perform a catalyst degradation restraint process of prohibiting the fuel cut when the temperature of the catalyst is higher than a threshold value.

If the fuel cut is prohibited, the reduction in the number or rate of opportunities of execution of the fuel cut is accompanied by a reduced number or rate of opportunities to diagnose the presence or absence of abnormality of the air/fuel ratio sensor. As a measure to cope with this phenomenon, Japanese Patent Application Publication No. 2009-167937 (JP 2009-167937 A) describes a technology in which execution of the catalyst degradation restraint process is prevented when the presence or absence of abnormality of the air/fuel ratio sensor has not been determined.

In the case where the catalyst temperature is high and the catalyst degradation restraint process is restricted because the presence or absence of abnormality of the air/fuel ratio sensor has not been determined, if determination of the presence or absence of abnormality of the air/fuel ratio sensor is completed during execution of the fuel cut, the fuel cut may be prohibited and therefore fuel injection and ignition can be started. If the catalyst temperature declines after that, the fuel cut may be executed again. Intermittent repetitions of execution of the fuel cut in the foregoing manner may intermittently cause vibration and noise of the internal combustion engine. As a result, discomfort or sense of strangeness may be caused to an occupant of the vehicle.

SUMMARY OF THE INVENTION

The invention provides a control apparatus and a control method for an internal combustion engine which reduce the sense of strangeness caused to a vehicle occupant.

In accordance with a first aspect of the invention, a control apparatus for an internal combustion engine includes a catalyst purifying emission of the internal combustion engine, and an engine control unit configured to execute diagnosis regarding presence or absence of abnormality during execution of fuel cut. The engine control unit is configured to restrict the fuel cut according to temperature of the catalyst when the temperature is higher than a fuel-cut-restriction temperature of the catalyst. The engine control unit is configured to set the fuel-cut-restriction temperature is lower when the diagnosis has been completed than when the diagnosis has not been completed. The engine control unit is configured to continue the fuel cut if the diagnosis is completed during execution of the fuel cut while the temperature of the catalyst is between the fuel-cut-restriction temperature set before the completion of the diagnosis and the fuel-cut-restriction temperature set after the completion of the diagnosis.

According to the foregoing construction, if the diagnosis is completed during execution of the fuel cut, the fuel cut is continued even under a condition where the fuel cut would be restricted in a usual situation. Therefore, alternations between restriction and execution of the fuel cut can be avoided. Hence, the sense of strangeness caused to an occupant in the vehicle by alternations between restriction and execution of the fuel cut can be reduced.

In the above-described control apparatus, if the diagnosis is completed during execution of the fuel cut, the engine control unit may continue the fuel cut while the temperature of the catalyst is decreasing.

According to the foregoing construction, while the concern about the degradation of the catalyst resulting from execution of the fuel cut at high temperature of the catalyst is small, the fuel cut is continued. This lessens the influence of continuation of the fuel cut on degradation of the catalyst.

In the foregoing control apparatus, the engine control unit may restrict the fuel cut if the temperature of the catalyst is higher than or equal to a threshold value. The threshold value may be lower when the diagnosis has been completed than when the diagnosis has not been completed. When the diagnosis is completed during execution of the fuel cut, the engine control unit may continue the fuel cut even if the temperature of the catalyst is higher than or equal to the threshold value.

According to the foregoing construction, in the case where the diagnosis is completed during execution of the fuel cut, as an exceptional case, the fuel cut is continued if the temperature of the catalyst becomes equal to or higher than the threshold value because the threshold value has been lowered. Hence, alternations between restriction and execution of the fuel cut can be avoided.

In the foregoing control apparatus, when the diagnosis is completed during execution of the fuel cut, the engine control unit may continue the fuel cut until the temperature of the catalyst is lower than the threshold value.

According to the foregoing construction, the fuel cut is continued until the temperature of the catalyst decreases to a temperature at which the fuel cut is not restricted. Therefore, even after the fuel cut is continued as an exceptional case, the fuel cut can further be continuously executed.

A second aspect of the invention is a control method for an internal combustion engine which includes: purifying emission of the internal combustion engine by a catalyst; diagnosing presence or absence of abnormality during execution of fuel cut; restricting the fuel cut according to temperature of the catalyst; setting a fuel-cut-restriction temperature of the catalyst at which the fuel cut is restricted such that the fuel-cut-restriction temperature is lower when the diagnosis has been completed than when the diagnosis has not been completed; and continuing the fuel cut if the diagnosis is completed during execution of the fuel cut.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
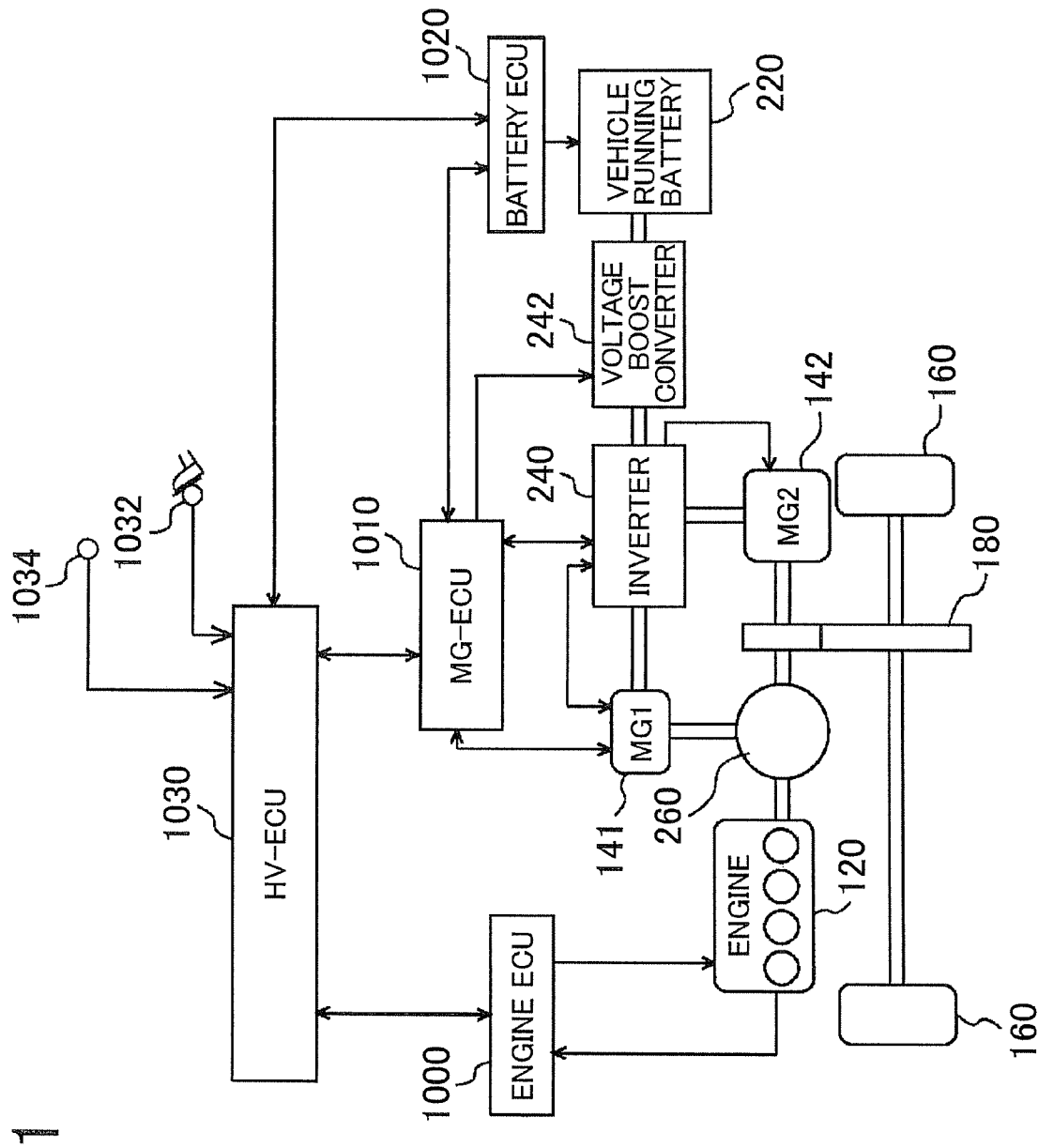
FIG. 1 is a schematic diagram showing a hybrid vehicle in accordance with an embodiment of the invention.

Embodiments of the invention will be described hereinafter with reference to the drawings. In the following description, the same component parts are denoted by the same reference characters. The names and functions thereof are also the same. Therefore, detailed descriptions of the same component parts will not be repeated.

With reference to FIG. 1, a hybrid vehicle shown as an example of a vehicle will be described. The invention may also be applied to a vehicle other than the hybrid vehicle.

A hybrid vehicle of this embodiment includes an internal combustion engine (hereinafter, simply referred to as engine) 120 provided with a plurality of cylinders, a first motor-generator 141 and a second motor-generator 142. The internal combustion engine is, for example, a gasoline engine, a diesel engine, etc. As a drive source of the hybrid vehicle of the embodiment, the engine 120 and the second motor-generator 142, as for examples, are used. That is, the hybrid vehicle runs on drive force from at least one of the engine 120 and the second motor-generator 142. The first motor-generator 141 and the second motor-generator 142 each function as a generator and an electric motor according to the state of travel of the hybrid vehicle.

The hybrid vehicle is further equipped with a speed reducer 180, a power split mechanism 260, a vehicle running battery 220, an inverter 240, a voltage boost converter 242, an engine electronic control unit (ECU) 1000, an MG-ECU 1010, a battery ECU 1020 and an HV-ECU 1030. The engine ECU 1000, the MG-ECU 1010, the battery ECU 1020 and the HV-ECU 1030 are configured to be able to send signals to and receive signals from each other.

The speed reducer 180 transfers drive force generated by the engine 120, the first motor-generator 141 and the second motor-generator 142 to driving wheels 160. Also, the speed reducer 180 transfers drive force from the driving wheels 160 to the engine 120, the first motor-generator 141 and the second motor-generator 142.

The power split mechanism 260 distributes the drive force generated by the engine 120 into two paths to the first motor-generator 141 and the driving wheels 160. The power split mechanism 260 employs, for example, a planetary gear device (not shown). The planetary gear device has a planetary carrier, a sun gear and a ring gear. The engine 120 is connected to the planetary carrier. The first motor-generator 141 is connected to the sun gear. The second motor-generator 142 and the output shaft (driving wheels 160) are connected to the ring gear. The power split mechanism 260 can function as a continuously variable transmission by controlling the rotation speed of the first motor-generator 141.

The vehicle running battery 220 stores electric power for driving the first motor-generator 141 and the second motor-generator 142. The inverter 240 converts the direct current from the vehicle running battery 220 into alternating current, and converts the alternating current from the first motor-generator 141 and the second motor-generator 142 into direct current. The voltage boost converter 242 converts or transforms voltage between the vehicle running battery 220 and the inverter 240.

The engine ECU 1000 controls the engine 120. The MG-ECU 1010 controls the first motor-generator 141, the second motor-generator 142, the battery ECU 1020 and the inverter 240 according to the state of the hybrid vehicle. The battery ECU 1020 controls the charging and discharging of the voltage boost converter 242 and the vehicle running battery 220.

The HV-ECU 1030 manages the engine ECU 1000, the MG-ECU 1010 and the battery ECU 1020. Thus, the HV-ECU 1030 controls the entire hybrid system so that the hybrid vehicle operates most efficiently.

Although FIG. 1 shows that the ECUs are separately provided, two or more of the ECUs may be integrated into one ECU (e.g., the engine ECU 1000, the MG-ECU 1010 and the HV-ECU 1030 may be integrated into one ECU).

The hybrid vehicle in accordance with this embodiment is controlled so as to run only on the drive force from the second motor-generator 142 when the efficiency of the engine 120 is not good, for example, at the time of standing start, the time of low-speed run, etc.

During usual running, the hybrid vehicle is controlled so as to run on drive force from both the engine 120 and the second motor-generator 142. For example, the driving wheels 160 are driven by one of the drive forces of the engine 120 that have been split by the power split mechanism 260. On the other hand, the first motor-generator 141 is driven so as to generate electricity. Using electric power generated by the first motor-generator 141, the second motor-generator 142 is driven. Thus, the engine 120 is assisted by the second motor-generator 142.

When the vehicle runs at high speed, electric power from the vehicle running battery 220 is supplied to the second motor-generator 142 so as to increase the output of the second motor-generator 142 and thus add to the drive force on the driving wheels 160.

At the time of deceleration, the second motor-generator 142 is driven by the driving wheels 160 to function as a generator and thus perform regenerative electric power generation. The electric power regenerated is stored in the vehicle running battery 220.

If the state of charge (SOC) of the vehicle running battery 220 declines, the output power of the engine 120 is increased to increase the amount of electric power generated by the first motor-generator 141. The electric power generated by the first motor-generator 141 is stored in the vehicle running battery 220.

In this embodiment, the HV-ECU 1030 sets both a power (the time rate of work calculated as a product of torque and rotation speed) that is needed to run the hybrid vehicle and a target power that includes the amount of electricity stored into the vehicle running battery 220 and other quantities. The power needed to run the hybrid vehicle is defined according to, for example, the accelerator operation amount that is detected by an accelerator position sensor 1032 and the vehicle speed detected by a vehicle speed sensor 1034. Instead of the target power, it is permissible to define a target drive force, a target acceleration, a target torque, etc.

The HV-ECU 1030 controls the engine ECU 1000, the MG-ECU 1010 and the battery ECU 1020 so that the target power is achieved by a combination of the output power of the engine 120 and the output power of the second motor-generator 142.

That is, the output power of the engine 120 and the output power of the second motor-generator 142 are determined so that the sum of the output power of the engine 120 and the output power of the second motor-generator 142 equals the target power. The engine 120 and the second motor-generator 142 are controlled so as to realize the output powers that are determined separately for each of them.

Figure 2:
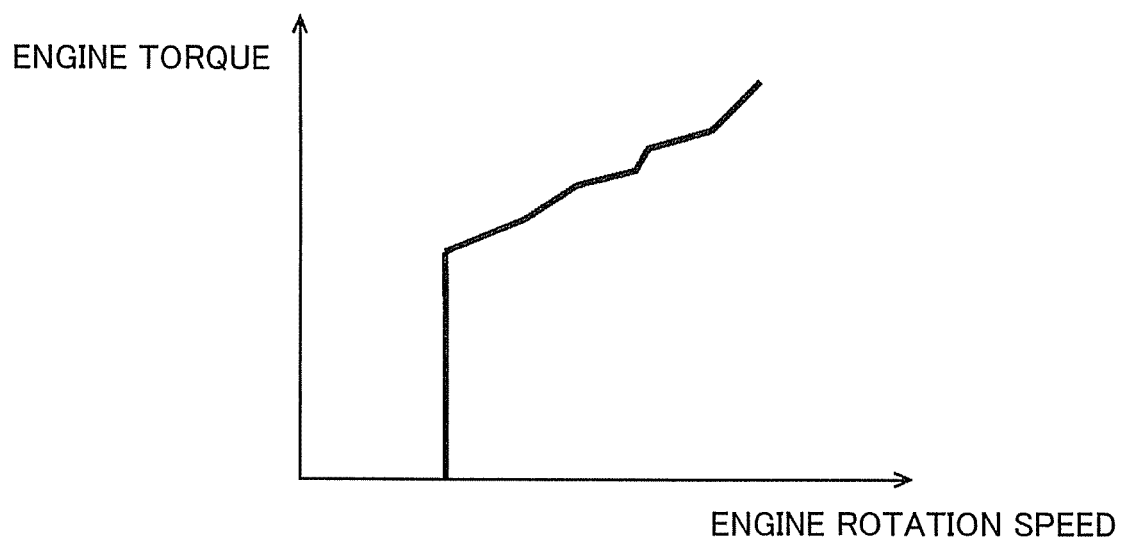
FIG. 2 is a diagram showing trajectory of the engine torque and the engine rotation speed at which fuel economy is good in accordance with the embodiment.

In this embodiment, the engine 120 is controlled so that, as shown in FIG. 2, an engine torque and an output shaft rotation speed of the engine 120 (hereinafter, also termed the engine rotation speed) that are considered to achieve good fuel economy are realized for the power that the engine 120 needs to output.

The engine torque and the engine rotation speed at which fuel economy is good are determined, for example, on the basis of results of an experiment, a simulation, etc. Thus, the engine torque and the engine rotation speed are determined so as to realize the best fuel economy within a range such that various conditions regarding drivability and the like can be satisfied.

Figure 3:
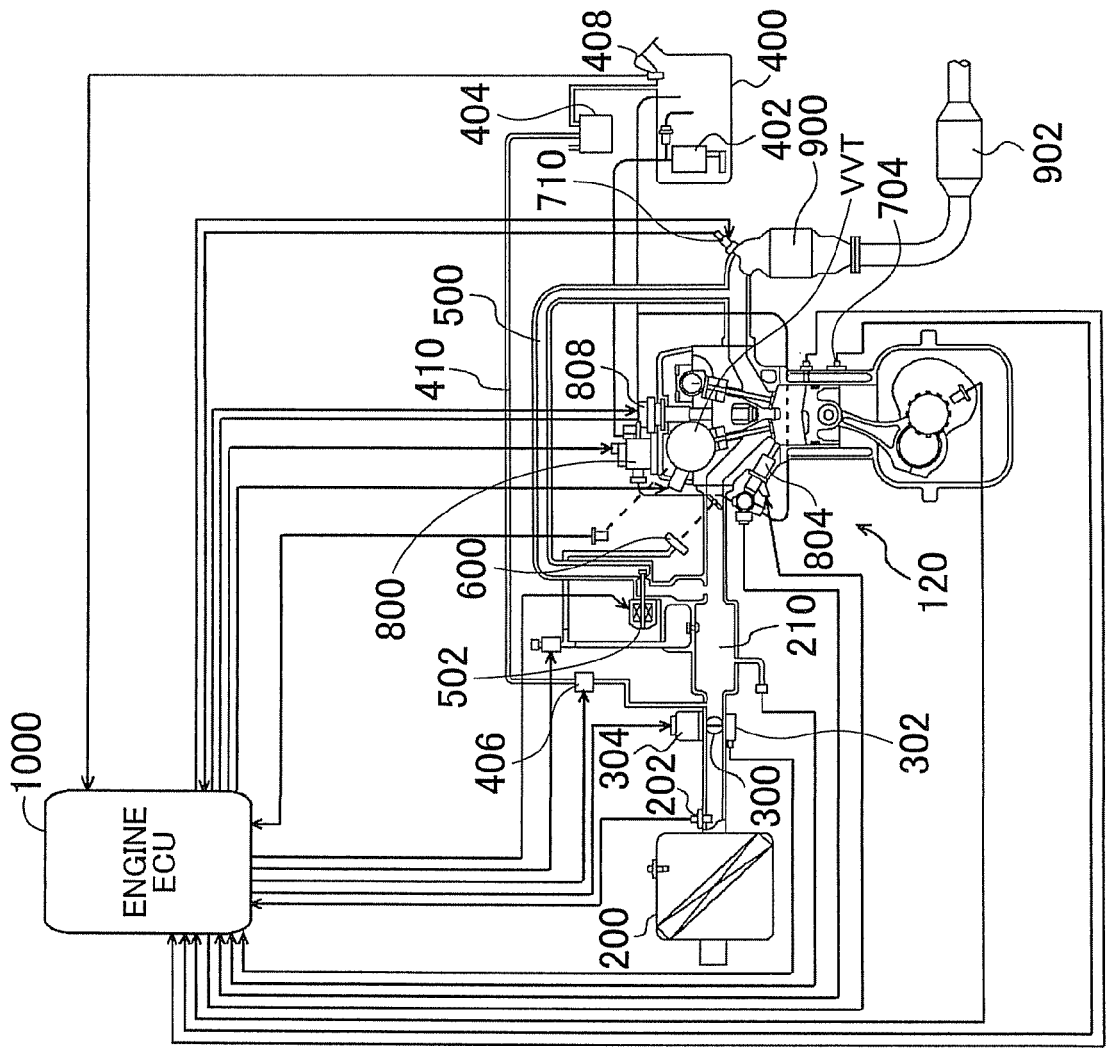
FIG. 3 is a diagram showing an engine in accordance with the embodiment.

With reference to FIG. 3, the engine 120 controlled by the engine ECU 1000 will be further described.

Air taken in through an air cleaner 200 passes through an intake passageway 210, and is introduced into combustion chambers of the engine 120. The flow rate of intake air is detected by an air flow meter 202, and a signal that represents the flow rate of intake air is input to the engine ECU 1000. The flow rate of intake air changes depending on the degree of opening of a throttle valve 300. The degree of opening of the throttle valve 300 is changed by a throttle motor 304 that is activated on the basis of the signal from the engine ECU 1000. The degree of opening of the throttle valve 300 is detected by a throttle position sensor 302, and a signal that represents the degree of opening of the throttle valve 300 is input to the engine ECU 1000.

Fuel is stored in a fuel tank 400, and is pumped by a fuel pump 402 and then is injected into the combustion chamber of each cylinder from an injector 804 via a high-pressure fuel pump 800. A mixture of air introduced from an intake manifold and fuel from the fuel tank 400 that is injected into the combustion chamber through the injector 804 is ignited by an ignition plug 808. Instead of the in-cylinder injector that injects fuel into the cylinder, or in addition to the in-cylinder injector, it is permissible to provide a port-injection injector that injects fuel toward an intake port.

Fuel vapor vaporizing from the fuel tank 400 is trapped by a charcoal canister 404. The vaporized fuel trapped by the charcoal canister 404 is purged into the intake passageway 210, for example, when the pressure inside the fuel tank 400 exceeds a threshold value. The vaporized fuel thus purged is taken into the combustion chamber and is burned therein.

The amount of purge is controlled by a canister purge vacuum switching valve (VSV) 406 that is provided on a passageway 410 that connects the charcoal canister 404 and the intake passageway 210. When the canister purge VSV 406 opens, vaporized fuel is purged. When the canister purge VSV 406 closes, the purge of vaporized fuel stops.

The canister purge VSV 406 is controlled by the engine ECU 1000. For example, the degree of opening of the canister purge VSV 406 is controlled by the engine ECU 1000 outputting a duty signal to the canister purge VSV 406.

The pressure inside the fuel tank 400 is detected by a pressure sensor 408, and a signal that represents the pressure is sent to the engine ECU 1000. The signal from the engine ECU 1000 which represents the pressure inside the fuel tank 400 is input to the HV-ECU 1030. Furthermore, signals that represent parameters of the state of operation of the engine, such as the engine rotation speed and the like, are input to the HV-ECU 1030 via the engine ECU 1000.

Exhaust gas passes through an exhaust manifold and then through a catalyst 900 and a catalyst 902, and then is emitted into the atmosphere. The catalysts 900 and 902 delivers the effect of purifying exhaust gas, that is, purifying emissions, at a predetermined temperature or higher and at a predetermined air/fuel ratio (e.g., the stoichiometric air/fuel ratio).

A part of exhaust gas is recirculated into the intake passageway 210 through an EGR pipe of an exhaust gas recirculation (EGR) apparatus. The flow rate of exhaust gas recirculated by the EGR apparatus is controlled by the EGR valve 502. The EGR valve 502 is duty-controlled by the engine ECU 1000. The engine ECU 1000 controls the degree of opening of the EGR valve 502 on the basis of various signals such as the signal of the engine rotation speed, the signal from the accelerator position sensor 1032, etc.

The EGR apparatus recirculates a part of the exhaust gas discharged from the engine back into the intake system and therefore mixes it with fresh air-fuel mixture, so that the combustion temperature drops. Therefore, the EGR apparatus reduces the amount of unburned fuel, pumping loss, the amount of nitrogen oxides (NOx), knocking, etc.

The oxygen concentration in exhaust gas is detected by an air/fuel ratio sensor 710 for the purpose of feedback control of the air/fuel ratio. A signal that represents the detected oxygen concentration is input to the engine ECU 1000, so that the air/fuel ratio of mixture is detected from the oxygen concentration in exhaust gas.

In the air/fuel ratio feedback control, correction is made so as to increase the amount of fuel injection, if the air/fuel ratio is leaner than the stoichiometric air/fuel ratio. If the air/fuel ratio is richer than the stoichiometric air/fuel ratio, correction is made so as to decrease the amount of fuel injection.

The engine ECU 1000 calculates an optimum ignition timing according to signals from various sensors, and outputs an ignition signal to the ignition plug 808. The ignition timing is calculated on the basis of, for example, the engine rotation speed, the cam position, the flow rate of intake air, the throttle valve opening degree, the engine coolant temperature, etc.

The ignition timing calculated is corrected by a knock control system. When knocking is detected by a knock sensor 704, the ignition timing is retarded by a certain angle at a time until knocking ceases to occur. On the other hand, when knocking no longer occurs, the ignition timing is advanced by a certain angle at a time.

As described above, results of detection by the air/fuel ratio sensor 710 affect the air/fuel ratio via the amount of fuel injection. Furthermore, the air/fuel ratio affects the emissions purifying performances of the catalysts 900 and 902. Therefore, if the air/fuel ratio is not appropriately controlled, exhaust gas may be released to the outside of the vehicle without being purified. In order to maintain the emissions purifying performances of the catalysts 900 and 902, it is desirable to promptly replace the catalysts with new ones if the air/fuel ratio sensor 710 has abnormality. Therefore, it is desirable that the engine ECU 1000 or the like diagnose the presence or absence of abnormality of the air/fuel ratio sensor 710.

In this embodiment, the presence or absence of abnormality of the air/fuel ratio sensor 710 is diagnosed during execution of the fuel cut in which fuel injection and ignition are temporarily stopped at the time of deceleration of the vehicle or the like. During execution of the fuel cut, the air/fuel ratio inevitably becomes lean. Therefore, according to whether the output of the air/fuel ratio sensor represents lean air/fuel ratio during execution of the fuel cut, it is possible to diagnose the presence or absence of abnormality of the air/fuel ratio sensor or the like.

For example, if during execution of the fuel cut, the output value of the air/fuel ratio sensor 710 indicates an air/fuel ratio is smaller than "18", the engine ECU 1000 determines that the air/fuel ratio sensor 710 is abnormal. This result is stored as a diagnostic result into a memory contained in the engine ECU 1000. On the other hand, if the output value of the air/fuel ratio sensor 710 indicates an air/fuel ratio that is greater than or equal to "18" during execution of the fuel cut, the engine ECU 1000 determines that the air/fuel ratio sensor 710 is normal. This result is stored as a diagnostic result into the memory contained in the engine ECU 1000.

Likewise, if the EGR valve 502 has abnormality, the air/fuel ratio cannot be appropriately controlled. Therefore, it is desirable that the engine ECU 1000 or the like diagnose the presence or absence of abnormality of the EGR valve 502 as well.

In this embodiment, the presence or absence of abnormality of the EGR valve 502 is diagnosed, for example, according to the pressure in the EGR pipe 500 during execution of the fuel cut. The pressure in the EGR pipe 500 is detected by, for example, a pressure sensor (not shown). The method for diagnosing the presence or absence of abnormality of the EGR valve 502 is not limited to the aforementioned method, but other methods may also be employed.

Incidentally, in the case where the catalysts 900 and 902 have high temperature, or the like, execution of the fuel cut may lead to reaction of particles of platinum (Pt) constituting the catalysts 900 and 902 with oxygen supplied in excess, resulting in growth into large particles of PT. Due to this, the total surface area of Pt may reduce, and the contact area of Pt with exhaust gas may reduce. In consequence, the emissions purifying performances of the catalysts 900 and 902 may decline.

Figure 4:
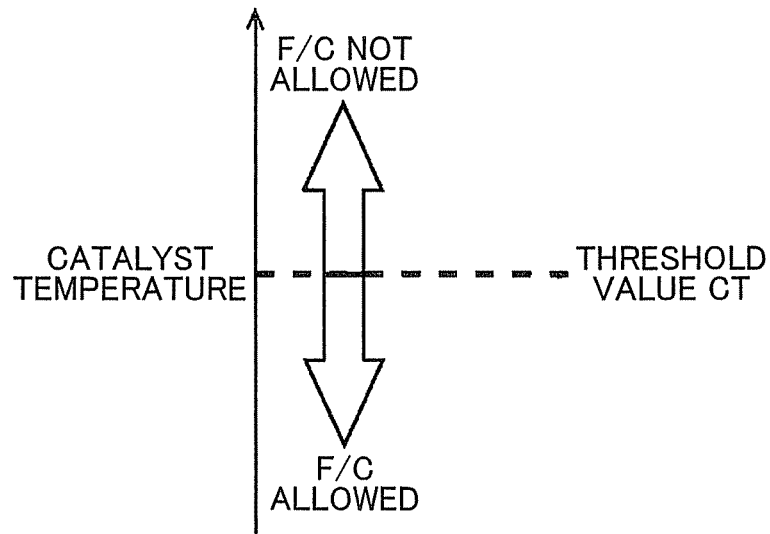
FIG. 4 is a diagram showing a threshold value CT with regard to the temperature of a catalyst in the embodiment.

In order to restrain degradation of the catalysts 900 and 902, the fuel cut is restricted in this embodiment if the temperatures of the catalysts 900 and 902 are higher than or equal to a predetermined threshold value CT as shown in FIG. 4. Specifically, execution of the fuel cut is avoided and fuel injection and ignition are continued despite satisfaction of a fuel cut execution condition that includes a condition that the accelerator operation amount is zero, a condition that the engine rotation speed is less than or equal to a predetermined value NE1, a condition that the engine rotation speed is greater than a resumption rotation speed NE2 (NE2<NE1). The resumption rotation speed NE2 is the rotational speed of resumption of fuel injection and ignition after the fuel cut. The temperatures of the catalysts 900 and 902 are estimated from the load of the engine 120 or the like. The temperatures of the catalysts 900 and 902 may also be detected by using a temperature sensor. The detection method for the temperatures of the catalysts 900 and 902 is not limited to the aforementioned methods. Incidentally, in FIG. 4, "F/C" represents fuel cut. This applies in other drawings as well.

If the fuel cut is restricted, the number or rate of opportunities to execute the fuel cut decreases. Therefore, the rate of opportunities to diagnose the presence or absence of abnormality of the air/fuel ratio sensor 710 and the EGR valve 502 may also be decrease.

Figure 5:
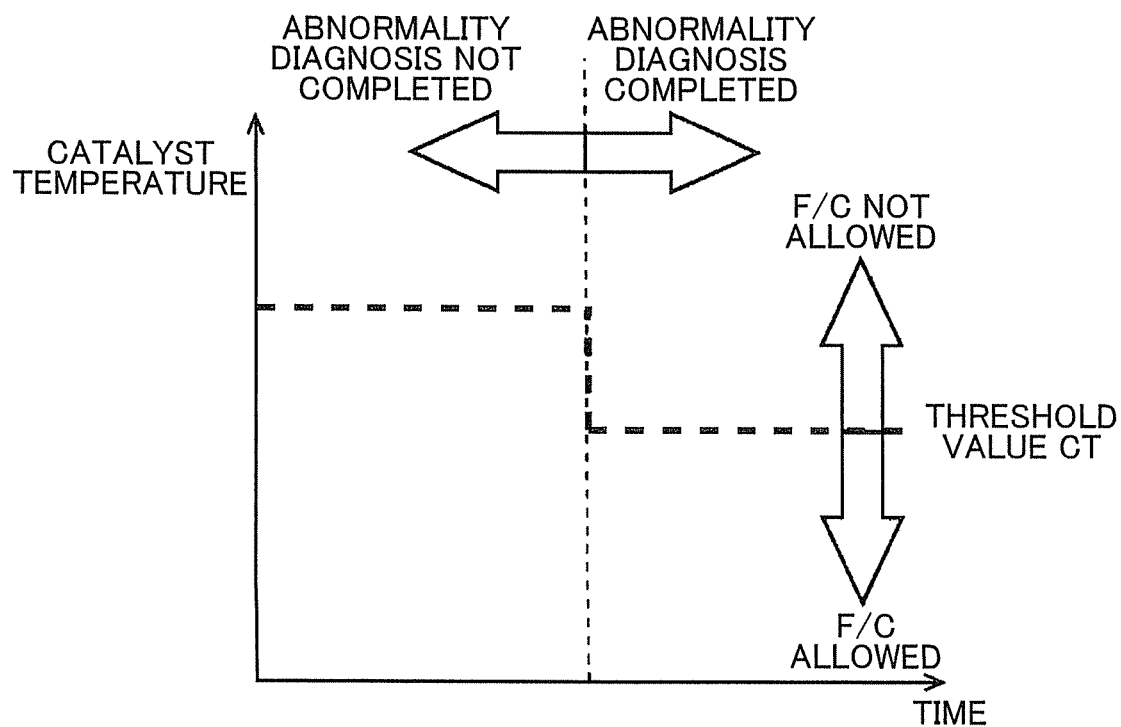
FIG. 5 is a diagram showing the threshold value CT before and after an abnormality diagnosis in accordance with the embodiment is completed.

In this embodiment, as shown in FIG. 5, in the case where the abnormality diagnosis with regard to the air/fuel ratio sensor 710 and the EGR valve 502 has been completed, the threshold value CT of the temperature of the catalysts 900 and 902 for restriction of the fuel cut is set lower than in the case where the abnormality diagnosis with regard to the air/fuel ratio sensor 710 and the EGR valve 502 has not been completed. That is, when the abnormality diagnosis has yet to be completed with regard to at least one of the air/fuel ratio sensor 710 and the EGR valve 502, the threshold valve CT is set higher than when the abnormality diagnosis has been completed with regard to both the air/fuel ratio sensor 710 and the EGR valve 502. Therefore, in the case where the abnormality diagnosis with regard to the air/fuel ratio sensor 710 and the EGR valve 502 has not been completed, a certain rate of opportunities to execute the fuel cut is secured.

Figure 6:
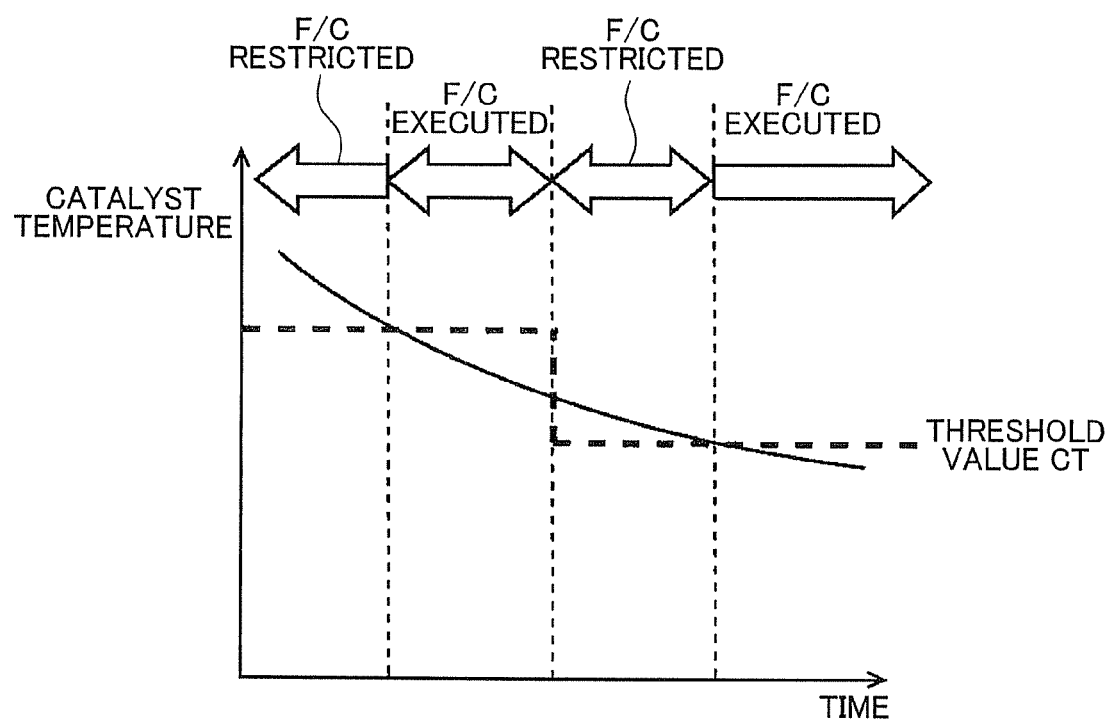
FIG. 6 is a diagram in which the temperature of the catalyst and the threshold value CT thereof in the embodiment are compared.

If the threshold value CT is changed according to whether the abnormality diagnosis has been completed or has not been completed yet, the restriction and the execution of the fuel cut may alternate. For example, as shown in FIG. 6, if the threshold value CT having been set higher than the current temperature of the catalysts 900 and 902 is set lower than the temperature of the catalysts 900 and 902 when the abnormality diagnosis is completed during execution of the fuel cut, the fuel cut is ended in association with the completion of the abnormality diagnosis. Then, fuel injection and ignition are started again. After that, if the temperature of the catalysts 900 and 902 decreases to below the threshold value CT, the fuel cut can be executed again. In order to prevent such hunting, this embodiment employs an arrangement in which if the abnormality diagnosis is completed during execution of the fuel cut while the temperature of the catalysts 900 and 902 is between the threshold value CT set for use prior to the completion of the abnormality diagnosis and the threshold value CT set for use after the completion of the abnormality diagnosis, the fuel cut is continued despite the temperature of the catalysts 900 and 902 being higher than or equal to the threshold value CT set for use after the completion of the diagnosis.

Figure 7:
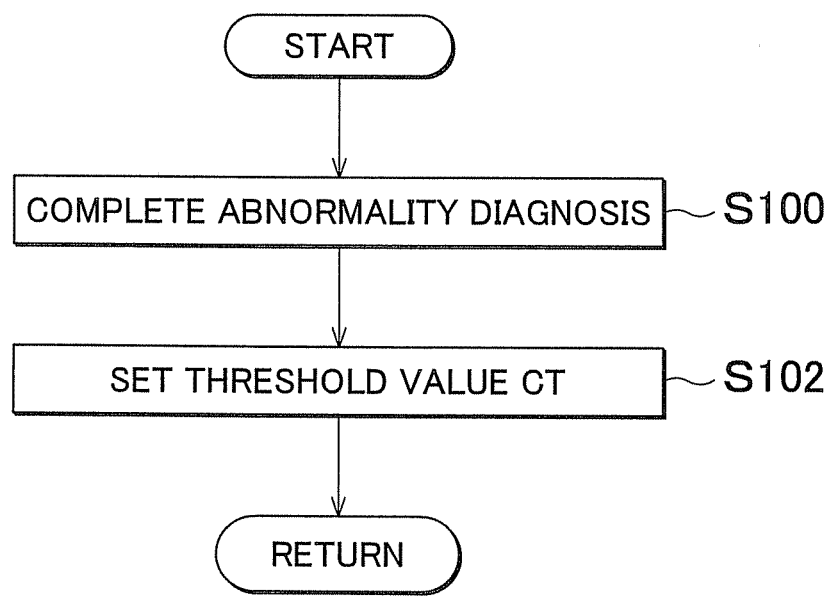
FIG. 7 is a flowchart (chart 1) showing a process that an engine ECU in the embodiment executes.

With reference to FIG. 7, a process that the engine ECU 1000 executes in order to set the threshold value CT in this embodiment will be described. The process described below may be realized by software or may also be realized by hardware and, furthermore, may also be realized by cooperation of software and hardware.

In step S100, it is determined whether the abnormality diagnosis with regard to the air/fuel ratio sensor 710 and the EGR valve 502 has been completed. After that, in step S102, the threshold value CT is set according to the whether the abnormality diagnosis has been completed. As described above, when the abnormality diagnosis with regard to both the air/fuel ratio sensor 710 and the EGR valve 502 has been completed, the threshold value CT is set lower than when the abnormality diagnosis with regard to both has not been completed.

Figure 8:
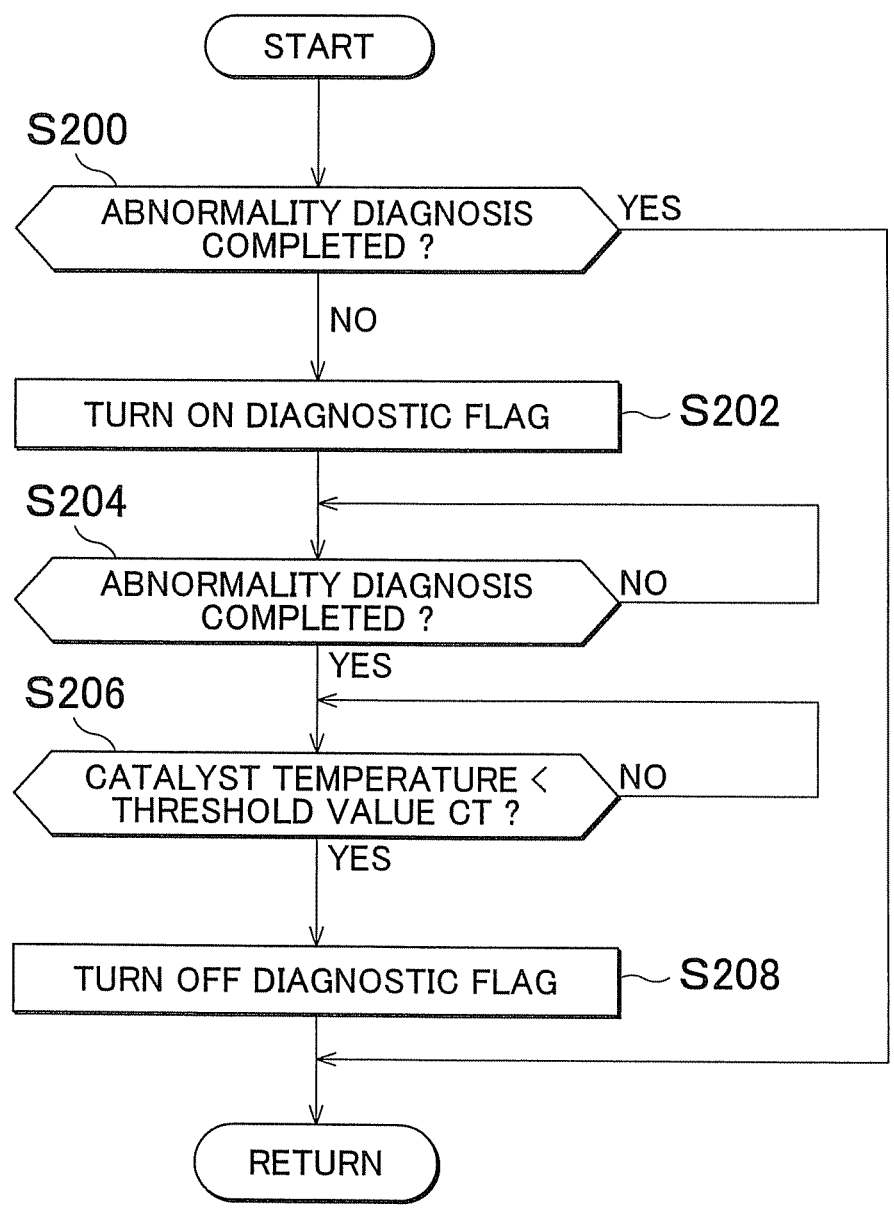
FIG. 8 is a flowchart (chart 2) showing a process that the engine ECU in the embodiment executes.

With reference to FIG. 8, a process that the engine ECU 1000 executes in order to turn on or off a diagnostic flag that is used when the fuel cut is executed in this embodiment will be described. Incidentally, the initial state of the diagnostic flag when the process described below is an off-state.

In step S200, it is determined whether the abnormality diagnosis with regard to the air/fuel ratio sensor 710 and the EGR valve 502 has been completed. If, when the diagnostic flag is off, the abnormality diagnosis has not been completed with regard to at least one of the air/fuel ratio sensor 710 and the EGR valve 502 (NO in step S200), the diagnostic flag is turned on. On the other hand, if the diagnostic flag is off and the abnormality diagnosis has been completed with regard to both the air/fuel ratio sensor 710 and the EGR valve 502, this routine is temporarily ended.

If, while diagnostic flag is on, the abnormality diagnosis with regard to both the air/fuel ratio sensor 710 and the EGR valve 502 is executed and is completed, an affirmative determination is made in step S204 (YES in step S204). Then, if the temperature of catalysts 900 and 902 becomes lower than the threshold value CT (the threshold value CT that is set to a lower value) (YES in step S206), the diagnostic flag is turned off in step S208.

Figure 9:
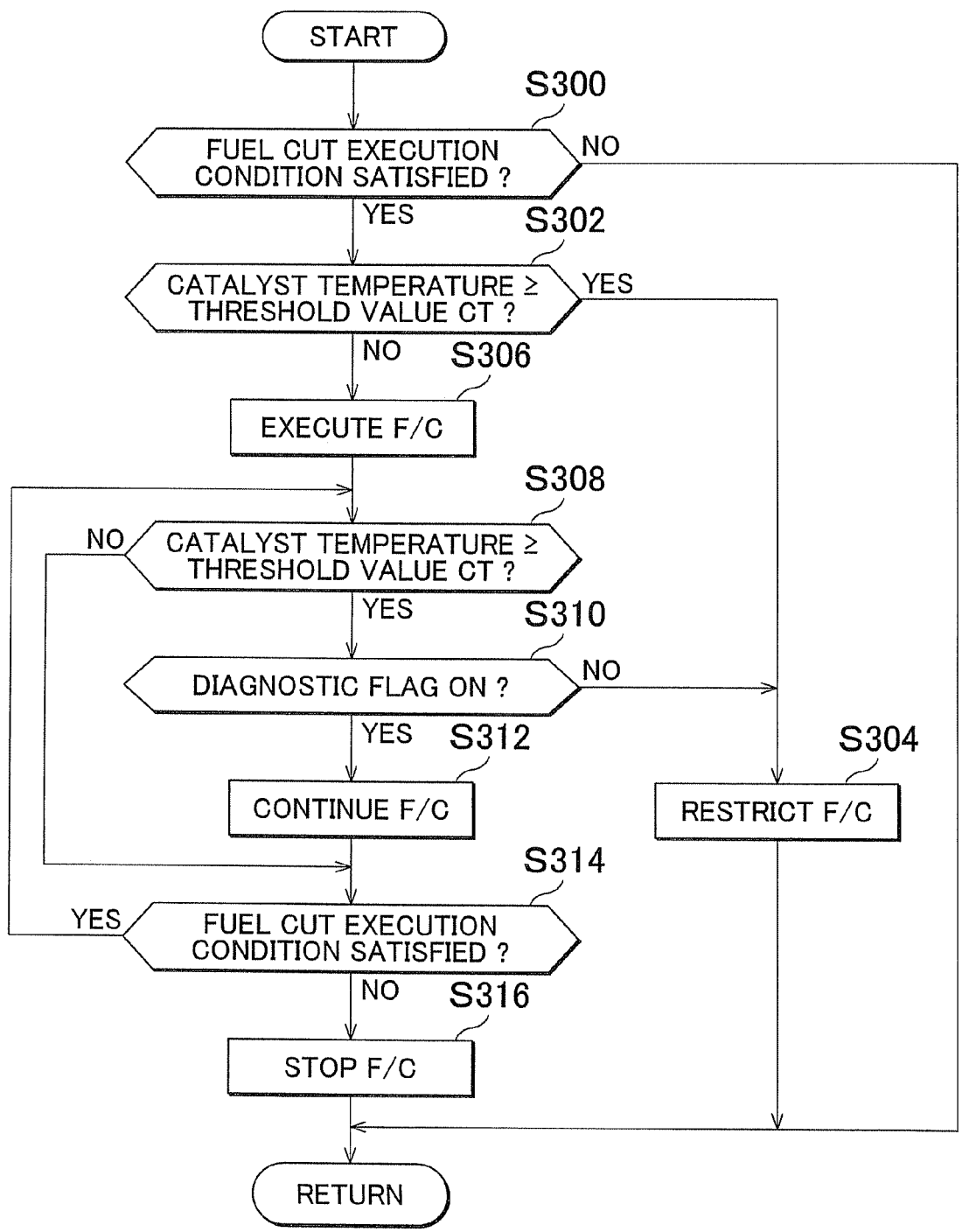
FIG. 9 is a flowchart (chart 3) showing a process that the engine ECU in the embodiment executes.

With reference to FIG. 9, a process that the engine ECU 1000 executes in order to execute the fuel cut in this embodiment will be described.

In step S300, it is determined whether the fuel cut execution condition that includes the condition that the accelerator operation amount is zero, the condition that the engine rotation speed is lower than or equal to a predetermined value NE1, the condition that the engine rotation speed is greater than the return rotation speed NE2, etc., has been satisfied. If the fuel cut execution condition is satisfied (YES in step S300), it is then determined in step S302 whether the temperature of the catalysts 900 and 902 is higher than or equal to the threshold value CT.

If the temperature of the catalysts 900 and 902 is higher than or equal to the threshold value CT (YES in step S302), the fuel cut is restricted in step S304. That is, the fuel cut is not executed but fuel injection and ignition are continued.

On the other hand, if the temperature of the catalysts 900 and 902 is lower than the threshold value CT (NO in step S302), the fuel cut is executed in step S306. After the fuel cut starts, it is determined again in step S308 whether the temperature of the catalysts 900 and 902 is higher than or equal to the threshold value CT.

For example, if the abnormality diagnosis with regard to the air/fuel ratio sensor 710 and the EGR valve 502 is completed during execution of the fuel cut, the threshold value CT is lowered, so that the temperature of the catalysts 900 and 902 is higher than the threshold value CT.

If the temperature of the catalysts 900 and 902 is higher than or equal to the threshold value CT (YES in step S308), it is determined in step S310 whether the diagnostic flag is on. If the diagnostic flag is off (NO in step S310), the fuel cut is restricted (step S304). That is, the fuel cut is stopped (ended).

On the other hand, if the diagnostic flag is on (YES in step S310), the fuel cut is continued in step S312 even if the temperature of the catalysts 900 and 902 is higher than or equal to the threshold value CT.

The fuel cut is continued as long as the aforementioned fuel cut execution condition is satisfied (YES in step S314) and the diagnostic flag is on (YES in step S310). It is to be noted herein that, as described above with reference to FIG. 8, if the temperature of the catalysts 900 and 902 does not become less than the threshold value CT, the diagnostic flag is not turned off. As a result, the diagnostic flag is kept on and the fuel cut is continued as long as the temperature of the catalysts 900 and 902 is higher than or equal to the threshold value CT. Therefore, if the abnormality diagnosis with regard to the air/fuel ratio sensor 710 and the EGR valve 502 is completed during execution of the fuel cut, the fuel cut is continued until the temperature of the catalysts 900 and 902 decreases to below the threshold value CT. Incidentally, after the diagnostic flag is turned off, the temperature of the catalysts 900 and 902 is lower than the threshold value CT, so that the fuel cut is further continued.

Even when the diagnostic flag is on, the fuel cut is stopped in step S316 if the fuel cut execution condition becomes unsatisfied (NO in step S314) while the fuel cut is continued.

Figure 10:
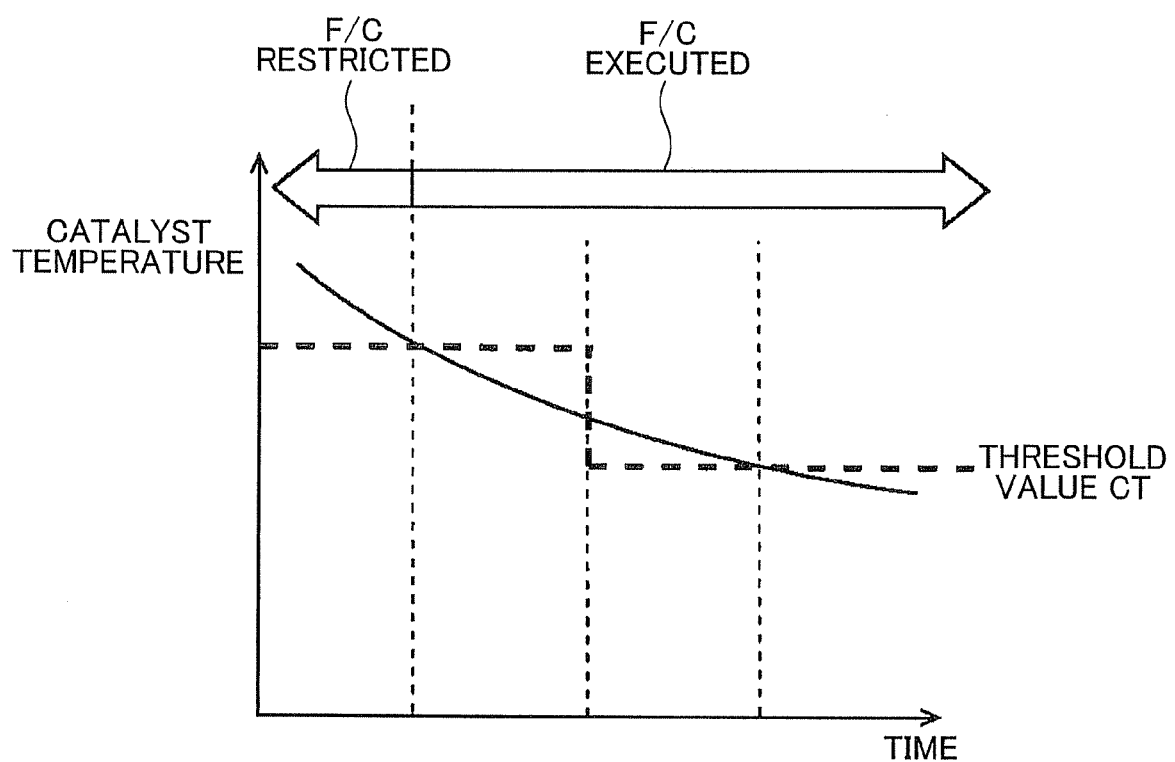
FIG. 10 is a diagram showing the temperature of the catalyst and the threshold value CT in the embodiment when the fuel cut is continued.

As described above, in the embodiment, even if the temperature of the catalysts 900 and 902 becomes higher than or equal to the threshold value CT because the threshold value CT has been lowered in association with completion of the diagnosis during execution of the fuel cut, the fuel cut is continued as shown in FIG. 10. Therefore, alternations between restriction and execution of the fuel cut can be avoided.

In another embodiment, in the case where the abnormality diagnosis is completed during execution of the fuel cut while the temperature of the catalysts 900 and 902 is between the threshold value CT set for use prior to the completion of the abnormality diagnosis and the threshold value CT set for use after the completion of the abnormality diagnosis, the threshold value CT may be kept higher than the temperature of the catalysts 900 and 902 and therefore the fuel cut may be continued by, for example, delaying the re-setting of the threshold value CT.

The foregoing embodiments are mere illustrations in any respect, and should be considered not to be restrictive. The scope of the invention is shown not by the foregoing description but by the ranges defined by the claims for patent, and it is intended that all the modifications and changes within the meaning and scope equivalent to the claims for patent are included within the scope of the invention.

What is claimed is:

1. A control apparatus for an internal combustion engine, comprising:
    a catalyst purifying emission of the internal combustion engine; and
    an engine control unit configured to execute diagnosis regarding presence or absence of abnormality during execution of fuel cut,
    the engine control unit being configured to restrict the fuel cut according to temperature of the catalyst when the temperature is higher than a fuel-cut-restriction temperature of the catalyst,
    the engine control unit being configured to set the fuel-cut-restriction temperature is lower when the diagnosis has been completed than when the diagnosis has not been completed, and
    the engine control unit being configured to continue the fuel cut if the diagnosis is completed during execution of the fuel cut while the temperature of the catalyst is between the fuel-cut-restriction temperature set before the completion of the diagnosis and the fuel-cut-restriction temperature set after the completion of the diagnosis.

2. The control apparatus according to claim 1, wherein if the diagnosis is completed during execution of the fuel cut, the engine control unit continues the fuel cut while the temperature of the catalyst is decreasing.

3. The control apparatus according to claim 1, wherein:
the engine control unit restricts the fuel cut if the temperature of the catalyst is higher than or equal to a threshold value;
the threshold value is lower when the diagnosis has been completed than when the diagnosis has not been completed; and
when the diagnosis is completed during execution of the fuel cut, the engine control unit continues the fuel cut even if the temperature of the catalyst is higher than or equal to the threshold value.

4. The control apparatus according to claim 3, wherein
when the diagnosis is completed during execution of the fuel cut, the engine control unit continues the fuel cut until the temperature of the catalyst is lower than the threshold value.

5. A control method for an internal combustion engine, comprising:
purifying emission of the internal combustion engine by a catalyst;
diagnosing presence or absence of abnormality during execution of fuel cut;
restricting the fuel cut according to temperature of the catalyst;
setting a fuel-cut-restriction temperature of the catalyst at which the fuel cut is restricted such that the fuel-cut-restriction temperature is lower when the diagnosis has been completed than when the diagnosis has not been completed; and
continuing the fuel cut if the diagnosis is completed during execution of the fuel cut.

* * * * *